W. H. HORNUM,

Assignor to THE HORNUM PATENT REGISTER MANUFACTURING CO.

Fare-Register.

No. 9,008. Reissued Dec. 30, 1879.

Witnesses.
Otto Hufeland
William Miller

Inventor.
William Hans Hornum
by
Van Santvoord & Hauff,
his attorneys.

N. PETERS, PHOTO-LITHOGRAPHER, WASHINGTON, D. C.

2 Sheets—Sheet 2.

W. H. HORNUM,

Assignor to THE HORNUM PATENT REGISTER MANUFACTURING CO.

Fare-Register.

No. 9,008. Reissued Dec. 30, 1879.

Witnesses:
Otto Hufeland
William Miller.

Inventor.
William Hans Hornum
by Van Santvoord & Lauff
his attorneys.

N. PETERS, PHOTO-LITHOGRAPHER, WASHINGTON, D. C.

UNITED STATES PATENT OFFICE.

WILLIAM H. HORNUM, OF NEW YORK, N. Y., ASSIGNOR TO THE HORNUM PATENT REGISTER MANUFACTURING COMPANY.

IMPROVEMENT IN FARE-REGISTERS.

Specification forming part of Letters Patent No. 194,913, dated September 4, 1877; Reissue No. 9,008, dated December 30, 1879; application filed September 15, 1879.

*To all whom it may concern:*

Be it known that I, WILLIAM H. HORNUM, of the city, county, and State of New York, have invented a new and useful Improvement in Fare-Registers, which improvement is fully set forth in the following specification, reference being had to the accompanying drawings, in which—

Figure 2:
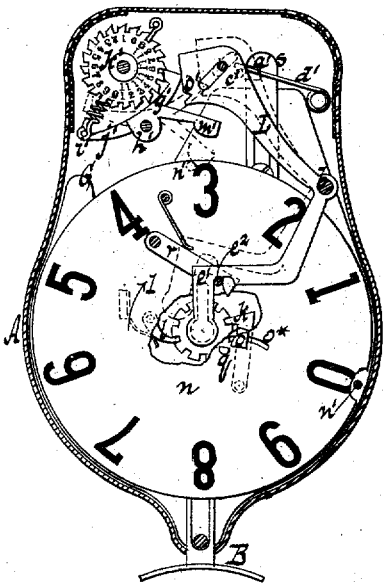
Figure 1:
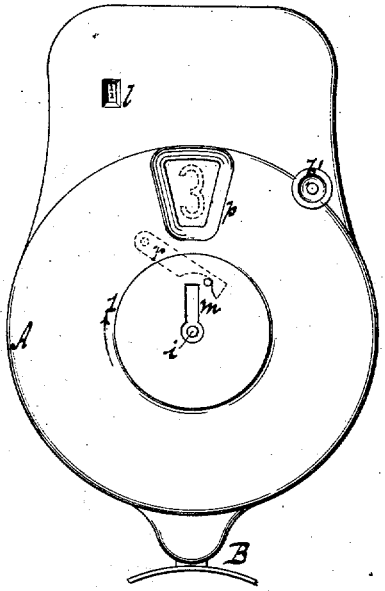
Figure 3:
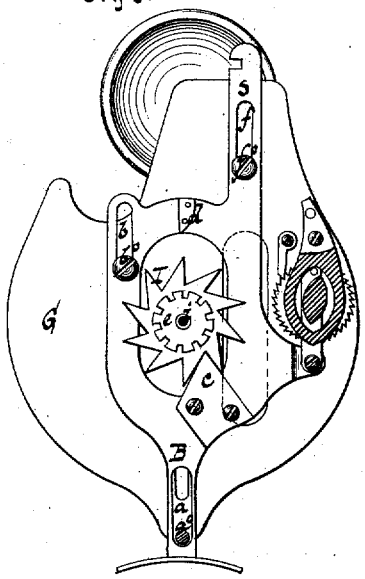
Figure 4:
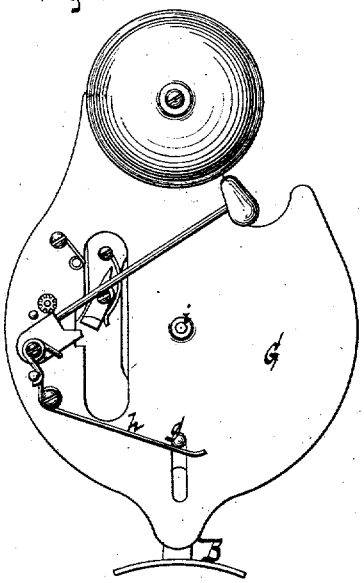
Figure 5:
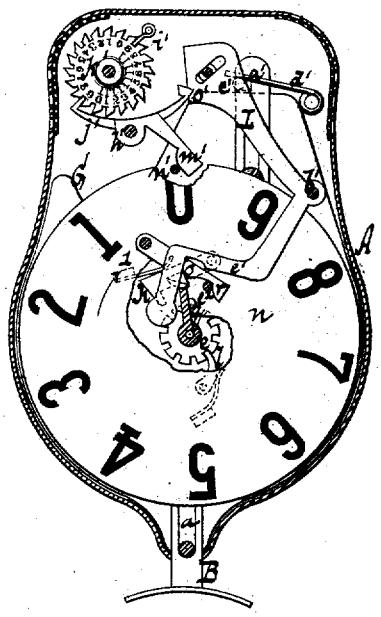
Figure 6:
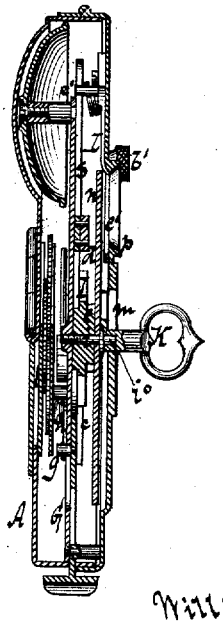
Figure 7:
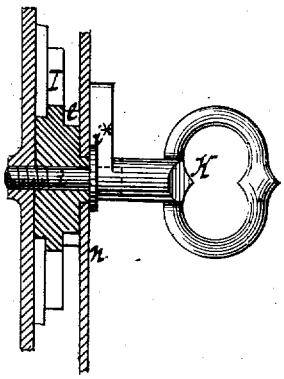

Figure 1 represents a face view of my register when the same is closed up ready for use. Fig. 2 is a similar view of the same, the cover of the case having been removed and some portions being broken away, so as to expose the parts below. Fig. 3 is a face view of the partition-plate, with the principal working parts of my register supported by the same. Fig. 4 is a rear view of the same. Fig. 5 is a similar view to that represented in Fig. 2, but showing the working parts in a different position. Fig. 6 is a longitudinal vertical section of the register. Fig. 7 is a detached view of the key on a larger scale than the previous figures.

Similar letters indicate corresponding parts.

My invention relates to counting or tallying machines more especially designed for fare-registering purposes, and belongs more particularly to the class of such registers known as "duplex" machines, or registering-machines in which are combined two sets of registering mechanism simultaneously operated in connection with an alarm by the same prime mover, one of said mechanisms being for the purpose of recording the number of fares taken on each trip of the car or vehicle, and capable of being set to zero or the starting-point at the beginning of each trip, constituting what is called a "trip" register, while the other of said mechanisms is for the purpose of recording not only the number of fares collected on each single trip, but the whole number collected on a series of consecutive trips, constituting what is called a "general," "continuous," or "permanent" register.

By the employment of such a machine frauds and thefts by the receiver of the fares are prevented, the conductor of the car, driver of the vehicle, or collector being required, as each fare is received, to operate the register and sound an alarm, which notifies the passenger of the proper registry of his fare.

My present invention constitutes an improvement on the register shown in Letters Patent No. 193,958, granted to the Hornum Patent Register Manufacturing Company, and my apparatus embodies in its organization a permanent or general register, a trip-register, an alarm, a trip-indicator or zero-register, an actuator or prime mover common to the register and to the alarm, and a zero-stop to prevent the trip-register from being turned beyond zero independent of its prime mover, a key-hole guard, a key, a latch for locking the prime mover, and a catch for retaining the latch in its locking position and for imparting motion to the trip-indicator or zero-register.

My invention consists of certain new combinations of the devices above enumerated, which are recited at the close of this specification.

In the drawings, the letter A designates a case, made of sheet metal or any other suitable material, in the form best adapted for the purpose for which it is to be used. In this case is situated a slide or prime mover, B, which serves to actuate the single-trip register, the alarm, and the general register, if such is used. Said prime mover is guided by slots *a b f*, catching over pins $a^{\circ}$ $b^{\circ}$ $f^{\circ}$, which are secured in a plate, G, Fig. 3, that is secured in the case A, and forms a partition between the single-trip register on one side and the alarm and general register on the opposite side, and which supports the principal working parts of my apparatus.

The end of the prime mover extends through a slot in the edge of the case, and is provided with a finger-piece, which serves to operate the same. In the under surface of the prime mover is secured a pin, *g*, which extends through a slot in the partition-plate G, Fig. 4, and bears on a spring, *h*, which has a tendency to throw said slide up to the position shown in the drawings.

On the prime mover are secured two teeth or pallets, *c d*, which engage with an escapement-wheel, I, which serves to impart motion to the single-trip register. These pallets are situated on opposite sides of the ratchet-wheel, so that when the prime mover is in its position of rest the pallet *c* engages with the escapement-wheel I, and when the prime mover is drawn out the pallet *d* is caused to act on said escapement-wheel, causing it to turn for the space of half a tooth, and when the prime mover is allowed to recede by the action of the spring *h* the pallet *c* acts on another tooth of the escapement-wheel, so as to turn the same for the space of half a tooth. Consequently, for each up-and-down stroke of the prime mover the escapement-wheel is turned one tooth. In the example represented by the drawings I have shown only the unit-disk *n* of the single-trip register. In practice a ten-disk will be combined with this unit-disk. On the unit-disk are marked the figures from 0 to 9.

To the escapement-wheel I is firmly connected a ratchet-wheel, *e*, both these wheels being made to rotate on a pin or arbor, *i*, fixed in the partition-plate G. The ratchet-wheel *e* is provided with a tubular hub, which forms the bearing for the unit-disk *n*, Fig. 6, and on the under side of this unit-disk are secured two pawls, *k l*, which engage with the ratchet-wheel, so that when both pawls are in gear the unit-disk cannot be turned in either direction independent of the ratchet-wheel, but when the pawl *n* is thrown out of gear the unit-disk can be rotated in the direction of the arrow 1, Fig. 2, independent of the ratchet-wheel, but not in the direction opposite to this arrow.

The unit-disk is retained on the tubular hub of the ratchet-wheel *e* by a flange, *i**, formed on pin *i*, Figs. 5 and 6, and from this flange rises a stud, *i*°, for the reception of a key, K, a detached view of which on an enlarged scale is shown in Fig. 7. This key is inserted through a key-hole, *m*, Fig. 1, in the cover of the case, and from the pawl *k* extends a tappet, *o*, through a slot, *o**, Fig. 2, in the unit-disk, said tappet and slot being in such relation to the key-hole *m* and to the figure 0 on the unit-disk that the key cannot be inserted when said tappet is situated between the key-hole and the figure 0, and, furthermore, the key cannot be withdrawn except at the time the unit-disk has been turned to zero, as will be presently more fully explained.

When either of the figures 1 to 9—for instance, the figure 3—stands opposite to the opening *p* in the cover of the case A, Figs. 1 and 2, and it is desired to turn the unit-disk to zero by means of the key, the key is inserted through the key-hole and turned in the direction of the arrow 1, Fig. 2. The face of the tappet *o* is rounded, and as the bit of the key strikes this face it slides under the tappet, and the pawl *k* is thrown out of gear with the ratchet-wheel *e*. At the same time the bit of the key strikes a pin, *q*, secured in the unit-disk near to and inside of the slot *o**, Fig. 2, so that it cannot slip from under the tappet *o*, and that by turning the key in the direction of arrow 1 the unit-disk is compelled to turn in the same direction. When the key has been turned far enough to come beneath the key-hole, which is the case when the unit-disk has been turned to zero, the key can be withdrawn; but it cannot be taken out before the unit-disk has reached this position. A pawl, *r*, secured on the inside of the cover, prevents the key being turned backward in the direction opposite to arrow 1, in order to get it out without turning the unit-disk to zero. This pawl is so arranged that it swings out of the way when the key is turned in the direction of arrow 1. (See Fig. 1.) The pawl *k* is held in gear with the ratchet-wheel *e* by a spring, and, if an attempt is made to manipulate the registering mechanism with a key, the bit of which is not long enough, said pawl remains in gear with the ratchet-wheel, and the unit-disk cannot be turned.

The prime mover is provided with an extension, *s*, near the upper end of which is a notch, *a'*, and close beneath the cover of the case A is situated a latch, L, which can be turned by means of a button, *b'*, that projects through the cover, so that a nose or pin, *c'*, which is secured on said latch, can be thrown in gear with the notch *a'*, as shown in Fig. 5. A spring, *d'*, forces the latch back to the position shown in Fig. 2. On the inner end of the latch L is secured an arm, *e'*, which extends down, and which, when the latch is in the position shown in Fig. 2, covers the key-hole, and consequently forms a key-hole guard, said arm being retained in position by a pin, $e^2$, in the cover of the case. By turning the latch to the position shown in Fig. 5 the key-hole guard is caused to swing from under the key-hole, so that it leaves the same free for the entrance of the key.

If the latch L is thrown in gear with the prime mover, it is retained by a catch, *g'*, which swings on a pivot, *h'*, and is exposed to the action of a spring, *i'*, which has a tendency to throw said catch down to the position shown in Fig. 5. With this catch is combined an anchor, *j*, which engages with an escapement-wheel, *k'*, so that each time the catch drops down the escapement-wheel is turned half a tooth, and when the catch rises the escapement-wheel is turned again half a tooth. The face of this escapement-wheel forms a dial, which I term the "trip-indicator" or "zero-register," and which contains a series of figures or signs, one of which is visible through an aperture, *l'*, Fig. 1, in the cover of the case whenever the escapement-wheel has been turned a full tooth; but at the time the catch *g'* occupies the position shown in Fig. 5 the figure or sign on the trip-indicator or zero-register which had previously been exposed to view is displaced, and the succeeding figure or sign is not yet visible. By these means the movements of the latch L are recorded, and since the latch is only moved when the register is to be turned to zero, which is usually done at the end of each half-trip, the trip-indicator or zero-register shows when and how many times the single-trip register has been set to zero and on which of its trips the car or other vehicle is running.

On the catch $g'$ is secured a toe, $m'$, and when the catch has been depressed to the position shown in Fig. 5 the outer end of this toe assumes such a position that a tooth or pin, $n'$, projecting from the unit-disk $n$ strikes the same at the moment the single-trip register has been turned to zero.

When the catch $g'$ is in its locking position, as shown in Fig. 5, it engages with a V-shaped notch, $o'$, in the edge of the locking-latch, so that it requires a certain power to throw it out of gear. As soon as the tooth $n'$ strikes the toe $m'$ a slight pressure on the key in the direction of arrow 1, Figs. 2 and 5, releases the catch $g'$, leaving the key in position to be withdrawn. At the same time the tappet $o$, being forced outward by the bit of the key, strikes the pin $e^2$, thus preventing the unit-disk from being turned beyond zero by means of the key. As soon as the key is taken out the spring $d'$ forces the locking-latch back to the position shown in Fig. 2, the trip-indicator $k'$ advances the second half-tooth, and the key-hole guard covers the key-hole, and the tappet $o$ recedes, so that when the unit-disk is actuated by the prime mover said tappet forms no obstruction to its motion. While the prime mover is locked by the latch L and the single-trip register is set to zero, neither the general register nor the alarm mechanism can be moved, and the indication of the trip-indicator or zero-register is displaced, and it does not show any new indication until the prime mover is released.

The construction of the general register and that of the alarm mechanism are the same as that described in my Patent No. 185,536, dated December 19, 1876, and I do not, therefore, give a detailed description of these parts in this specification. At the same time it must be remarked that the locking-latch, the key-hole guard, and the trip-indicator or zero-register can be applied to fare-registers of different construction. For instance, for the unit-disk $n$ a trip-hand may be substituted; and the construction of the general register may also be changed, as will readily suggest itself to a practical mechanic.

What I claim as new, and desire to secure by Letters Patent, is—

1. The combination, in a fare-register, of a registering mechanism adapted to be set to zero by a key independent of its prime mover, an alarm, a prime mover common to both, and a key-hole guard connected to a latch which serves to lock the prime mover while the register is set, and can only be released by turning the register to zero or starting-point, the whole being adapted to operate substantially as set forth.

2. The combination, in a fare-register, of a single-trip register adapted to be set to zero by a key independent of its prime mover, a general register, an alarm, a prime mover common to all, and a key-hole guard connected to a latch which serves to lock the prime mover while the single-trip register is being set, and can only be released by turning the single-trip register to zero or starting-point, the whole being adapted to operate substantially as described.

3. The combination, in a fare-register, of a registering mechanism, a prime mover for imparting to said mechanism a step-by-step movement, a device for turning the registering mechanism to zero independent of the prime mover, and a trip-indicator or zero-register the indication or sign of which is changed by means of the device that serves to turn the registering mechanism to zero independent of its prime mover, but which zero-register remains stationary when the registering mechanism is moved past zero by the prime mover, substantially as described.

4. The combination, in a fare-register, of registering mechanism, an alarm, a prime mover common to both, a device for turning the registering mechanism to zero independent of the prime mover and of the alarm, and a trip-indicator or zero-register the indication or sign of which is changed by means of the device that serves to turn the registering mechanism to zero independent of the prime mover, but which zero-register remains stationary when the registering mechanism is moved past zero in connection with the alarm, substantially as set forth.

5. The combination, in a fare-register, of a single-trip register for registering the fares collected on a certain stretch or half-trip, a general register for making permanent record of the fares registered, a prime mover common to both, a device for turning the single-trip register to zero independent of the prime mover, and a trip-indicator or zero-register which can be changed to another indication or sign only by means of the device that serves to turn the trip-register to zero independent of its prime mover, but which zero-register remains stationary when the single-trip register is moved past zero in connection with the general register, substantially as described.

6. The combination, in a fare-register, of a single-trip register, a general register, an alarm, a prime mover common to all three, a device for turning the single-trip register to zero independent of the prime mover, and a trip-indicator or zero-register which can be changed to another indication or sign only by means of the device that serves to turn the trip-register to zero independent of its prime mover, but which zero-register remains stationary when the single-trip register is moved past zero in connection with the general register, substantially as set forth.

7. The combination, substantially as hereinbefore described, of a registering mechanism, a prime mover for imparting a step-by-step movement to the registering mechanism, a device for setting the registering mechanism to zero independent of its prime mover, a trip-indicator or zero-register and connecting mechanism so constructed that the registering mechanism cannot be set to zero independent of its prime mover without operating the trip-indicator or zero-register, and the trip-indicator or zero-register can only be changed to show another indication or sign by operating the device for setting the registering mechanism to zero independent of the prime mover, substantially as described.

8. The combination, in a fare-register, of a single-trip register for recording the fares collected on each trip or half-trip, a general register for making a permanent record of the fares collected during a period of time, an alarm to announce the recording of each fare, a trip-indicator or zero-register incapable of being changed to another indication or sign without setting the single-trip register to zero, and a surrounding casing provided with slots or openings for inspecting the various indications or signs, all constructed and adapted to operate substantially as shown and described.

9. The combination, substantially as hereinbefore described, of a registering mechanism adapted to be set forward to zero independent of its prime mover, a prime mover adapted to impart to the registering mechanism a step-by-step movement, and a setting device adapted to turn the register in one direction only to zero and no farther, while the register, when actuated by its prime mover, can move freely beyond zero.

10. The combination, substantially as hereinbefore described, of a single-trip register, a general register, a prime mover common to both, a device for setting the single-trip register forward to zero independent of the general register, and mechanism which prevents the single-trip register from moving past zero when operated by the setting device, but allows the same to move past said point when actuated by the prime mover.

11. The combination, substantially as hereinbefore described, of a single-trip register, a general register, an alarm, a prime mover common to all three, a setting device for moving the single-trip register forward to zero independent of the general register and of the alarm, and mechanism which prevents the single-trip register from moving past zero when operated by the setting device, but allows the same to move past said point when actuated simultaneously with the general register.

12. The combination, substantially as hereinbefore described, of a registering mechanism adapted to be set to zero at will independent of its prime mover, a prime mover for actuating the registering mechanism, a trip-indicator, and mechanism which prevents the registering mechanism from being moved independent of its prime mover without first displacing the indication or sign of the trip-indicator or zero-register, and which does not allow the trip-indicator or zero-register to show another indication or sign before the registering mechanism has been set to zero.

13. The combination, in a fare-register, of a registering mechanism, a prime mover for imparting a step-by-step movement to said registering mechanism, mechanism for locking the prime mover, a key or button for turning the registering mechanism to zero independent of its prime mover, and a trip-indicator or zero-register for indicating when the registering mechanism has been set to zero by the key or button, substantially as shown and described.

14. The combination, substantially as hereinbefore described, of a registering mechanism, an alarm, a prime mover common to both, mechanism for turning the registering mechanism to zero independent of the prime mover, mechanism for locking the prime mover, and a trip-indicator or zero-register for indicating the number of times the registering mechanism has been set to zero independent of its prime mover.

15. The combination, substantially as hereinbefore described, of a single-trip register, a general register, an alarm, a prime mover common to all three, mechanism for turning the single-trip register to zero independent of the prime mover, mechanism for locking the prime mover, and a trip-indicator or zero-register for indicating the number of times the single trip-register has been set to zero independent of the prime mover.

16. The combination, substantially as hereinbefore described, of a registering mechanism, a prime mover for imparting a step-by-step movement to said registering mechanism, a device for turning the registering mechanism to zero independent of its prime mover, a trip-indicator or zero-register for indicating when the registering mechanism has been set to zero by the key or button, and mechanism for locking the prime mover and for displacing the indication of the trip-indicator or zero-register.

17. The combination, substantially as hereinbefore described, of a registering mechanism, an alarm, a prime mover common to both, a device for turning the registering mechanism to zero independent of its prime mover, a trip-indicator or zero-register for indicating when the registering mechanism has been set to zero by the key or button, and mechanism for locking the prime mover and for displacing the indication of the trip-indicator or zero-register.

18. The combination, substantially as hereinbefore described, of a single-trip register, a general register, an alarm, a prime mover common to all three, a device for turning the single-trip register to zero independent of its prime mover, a trip-indicator or zero-register for indicating when the single-trip register has been set to zero by said device, and mechanism for locking the prime mover and for displacing the indication of the trip-indicator or zero-register.

19. The combination, in a fare-register, of a registering mechanism, a prime mover adapted to impart to the registering mechanism a step-by-step movement, a key for turning the registering mechanism to zero independent of its prime mover, a trip-indicator or zero-register for indicating when the register has been set to zero, a key-hole guard connected to a latch which serves to lock the prime mover, and a catch which serves to retain the latch in its locking position and to displace the indication of the trip-indicator or zero-register, substantially as shown and described.

20. The combination, in a fare-register, of a registering mechanism, an alarm, a prime mover common to both, a key for turning the register to zero independent of its prime mover, a trip-indicator or zero-register for indicating when the register has been turned to zero, a key-hole guard connected to a latch which serves to lock the prime mover, and a catch which serves to retain the latch in its locking position and to displace the indication of the trip-indicator or zero-register, substantially as set forth.

21. The combination, in a fare-register, of a single-trip register, a general register, an alarm, a prime mover common to all three, a key for turning the single-trip register to zero independent of its prime mover, a trip-indicator or zero-register for indicating when the register has been turned to zero, a key-hole guard connected to a latch which serves to lock the prime mover, and a catch which retains the latch in its locking position and serves to displace the indication of the trip-indicator or zero-register, substantially as described.

22. The combination, in a fare-register, of a registering mechanism, a prime mover for imparting a step-by-step movement to said registering mechanism, a device for turning the register to zero independent of its prime mover, a trip-indicator or zero-register for indicating when the register has been turned to zero, a latch which serves to lock the prime mover, a catch which serves to retain the latch in its locking position, and a pin or equivalent device which is connected to the registering mechanism and serves to actuate the catch so as to release the prime mover and to change the indication of the trip-indicator or zero-register at the time the registering mechanism has been turned to zero, substantially as described.

23. The combination, in a fare-register, of a registering mechanism, an alarm, a prime mover common to both, a device for turning the register to zero independent of its prime mover, a trip-indicator or zero-register for indicating when the register has been turned to zero, a latch which serves to lock the prime mover, a catch which serves to retain the latch in its locking position, and a pin or equivalent device which is connected to the registering mechanism and serves to actuate the catch so as to release the prime mover and to change the indication of the trip-indicator or zero-register at the time the registering mechanism has been turned to zero, substantially as set forth.

24. The combination, in a fare-register, of a single-trip register, a general register, an alarm, a prime mover common to all three, a device for turning the single-trip register to zero independent of the prime mover, a trip-indicator or zero-register for indicating when the single-trip register has been turned to zero, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism has been turned to zero, substantially as described.

25. The combination, with an indicator disk or hand, and with a key, of a yielding zero-stop connected to the indicator-disk, and of a fixed pin or abutment, whereby the indicator disk or hand, when turned by the key, is stopped at zero, while the same can turn without obstruction when actuated by the prime mover, substantially as described.

26. The combination, in a fare-register, of a registering mechanism, a prime mover for imparting a step-by-step movement to said registering mechanism, a device for turning the register to zero independent of its prime mover, a zero-stop, a trip-indicator or zero-register for indicating when the register has been turned to zero independent of its prime mover, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism is held by the zero-stop, substantially as described.

27. The combination, in a fare-register, of a registering mechanism, an alarm, a prime mover common to both, a device for turning the register to zero independent of its prime mover, a zero-stop, a trip-indicator or zero-register for indicating when the register has been turned to zero independent of its prime mover, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism is held by the zero-stop, substantially as set forth.

28. The combination, in a fare-register, of a single-trip register, a general register, an alarm, a prime mover common to all three, a device for turning the single-trip register to zero independent of its prime mover, a zero-stop, a trip-indicator or zero-register for indicating when the single-trip register has been turned to zero independent of its prime mover, a latch which serves to lock the prime mover, a catch which retains the latch in its locking position, and a pin or equivalent device which is connected to the registering mechanism and serves to actuate the catch so as to release the prime mover and to change the indication of the trip-indicator or zero-register at the time the registering mechanism is held by the zero-stop, substantially as described.

29. The combination, in a fare-register, of a registering mechanism, a prime mover for imparting a step-by-step-movement to said registering mechanism, a key for turning the register to zero independent of its prime mover, a zero-stop which, when acted on by the key, retains the register at zero, but allows said register to turn freely past zero when the key is withdrawn, a trip-indicator or zero-register for indicating when the register has been turned to zero by the key, a latch which serves to lock the prime mover, a catch for retaining the latch in its locking position, and a pin or equivalent device which is connected to the registering mechanism and serves to actuate the catch so as to release the prime mover and to change the indication of the trip-indicator or zero-register at the time the registering mechanism is held by the zero-stop, substantially as set forth.

30. The combination, in a fare-register, of a registering mechanism, an alarm, a prime mover common to both, a key for turning the register to zero independent of its prime mover, a zero-stop which, when acted on by the key, retains the register at zero, but allows said register to turn freely past zero when the key is withdrawn, a trip-indicator or zero-register for indicating when the register has been turned to zero by the key, a latch which serves to lock the prime mover, a catch for retaining the latch in its locking position, and a pin or equivalent device which is connected to the registering mechanism and serves to actuate the catch so as to release the prime mover and to change the indication of the trip-indicator or zero-register at the time the registering mechanism is held by the zero-stop, substantially as described.

31. The combination, in a fare-register, of a single-trip register, a general register, an alarm, a prime mover common to all three, a key for turning the single-trip register to zero independent of its prime mover, a zero-stop which, when acted on by the key, retains the single-trip register at zero, but allows said register to turn freely when the key is withdrawn, a trip-indicator or zero-register for indicating when the register has been turned to zero by the key, a latch which serves to lock the prime mover, a catch for retaining the latch in its locking position, and a pin or equivalent device which is connected to the registering mechanism and serves to actuate the catch so as to release the prime mover and to change the indication of the trip-indicator or zero-register at the time the single-trip register is held by the zero-stop, substantially as set forth.

32. The combination, with the indicator-disk *n*, key K, ratchet-wheel *e*, and key-hole *m*, of pawls *k r* and tappet *o*, to prevent the key from being withdrawn until the indicator-disk has been turned to zero, substantially as set forth.

33. The combination, in a fare-register, of a single-trip register for registering the fares collected on each trip or half-trip, a general register for producing a permanent register of fares collected during a number of trips, an alarm to announce the recording of each fare, a trip-indicator or zero-register which is changed to another indication or sign by the act of setting the trip-register to zero independent of the general register and the alarm, but which zero-register does not change when the single-trip register is moved past zero in connection with the general register and the alarm, substantially as set forth.

34. The combination, substantially as hereinbefore described, of a single-trip register for registering the fares collected on each trip or half-trip and a general register for producing a permanent record of the fares collected during a number of trips, the single-trip register being adapted to be set to zero at will independent of the general register, a zero-register or sign, and mechanism so connected to the single-trip register and the zero-register that whenever the single-trip register is moved to zero independent of the general register the indication or sign of the zero-register will be changed, but when the single-trip register is moved past zero in connection with the general register the zero-register is not changed, substantially as described.

In testimony that I claim the foregoing I have hereunto set my hand and seal this 3d day of September, 1879.

WILLIAM H. HORNUM. [L. S.]

Witnesses:
W. HAUFF,
E. F. KASTENHUBER.